(12) United States Patent
Vesterinen et al.

(10) Patent No.: US 11,025,586 B2
(45) Date of Patent: Jun. 1, 2021

(54) MULTIPATH TCP WITH LTE CONNECTIONS

(71) Applicant: NOKIA SOLUTIONS AND NETWORKS OY, Espoo (FI)

(72) Inventors: Seppo Ilmari Vesterinen, Oulunsalo (FI); Mika Petri Olavi Rinne, Espoo (FI); Matti Einari Laitila, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 152 days.

(21) Appl. No.: 15/315,823

(22) PCT Filed: Jun. 2, 2014

(86) PCT No.: PCT/EP2014/061325
§ 371 (c)(1),
(2) Date: Dec. 2, 2016

(87) PCT Pub. No.: WO2015/185081
PCT Pub. Date: Dec. 10, 2015

(65) Prior Publication Data
US 2017/0104717 A1    Apr. 13, 2017

(51) Int. Cl.
*H04L 5/00* (2006.01)
*H04L 29/12* (2006.01)
(Continued)

(52) U.S. Cl.
CPC ........ *H04L 61/2007* (2013.01); *H04L 5/0098* (2013.01); *H04L 69/14* (2013.01);
(Continued)

(58) Field of Classification Search
None
See application file for complete search history.

(56) References Cited

U.S. PATENT DOCUMENTS

| 2011/0110378 | A1  | 5/2011  | Savolainen et al. |
| 2015/0181473 | A1* | 6/2015  | Horn ................. H04W 36/0027 370/331 |
| 2016/0309534 | A1* | 10/2016 | Teyeb .................... H04L 69/14 |

FOREIGN PATENT DOCUMENTS

| CN | 1643870 A   | 7/2005 |
| CN | 103313232 A | 9/2013 |

(Continued)

OTHER PUBLICATIONS

Phatak D. S. et al A novel mechanism for data streaming across multiple IP links for improving throughput and reliability in mobile environments; 2002; 2; vol. 2, Jun. 23, 2002 (Jun. 23, 2002), pp. 773-781, XP010593639, DOI: 10.1109/INFCOM.2002.1019323 ISBN: 978-0-7803-7476-8.

(Continued)

*Primary Examiner* — Robert M Morlan
(74) *Attorney, Agent, or Firm* — Squire Patton Boggs (US) LLP

(57) ABSTRACT

It is provided a method, comprising configuring a first internet protocol address and a second internet protocol address different from the first internet protocol address for a connection between an apparatus performing the method and a packet data network; assigning the first internet protocol address to a first data path for the connection and to assign the second internet protocol address to a second data path for the connection, wherein at least a part of the first data path belongs to a radio access technology; at least a part of the second data path belongs to the radio access technology; and the part of the first data path is different from the part of the second data path.

20 Claims, 6 Drawing Sheets

Source: InterDigital (Recreated by Signals Research Group)

(51) Int. Cl.
    *H04W 76/15*   (2018.01)
    *H04W 8/26*   (2009.01)
    *H04L 29/06*   (2006.01)
    *H04W 40/02*   (2009.01)
    *H04W 80/04*   (2009.01)
    *H04W 80/06*   (2009.01)
    *H04W 88/10*   (2009.01)

(52) U.S. Cl.
    CPC ............ *H04W 8/26* (2013.01); *H04W 40/02* (2013.01); *H04W 76/15* (2018.02); *H04L 5/001* (2013.01); *H04L 61/6077* (2013.01); *H04W 80/04* (2013.01); *H04W 80/06* (2013.01); *H04W 88/10* (2013.01)

(56) References Cited

FOREIGN PATENT DOCUMENTS

| EP | 2461631 A2 | 6/2012 |
|---|---|---|
| WO | WO 2013/083189 A1 | 6/2013 |

OTHER PUBLICATIONS

Hampel T et al Enhancements to improve the applicability of multipath TCP to Wireless Access Networks; draft-hampel-mptcp-applicability-wireless-networks-00; 2011; (Jun. 15, 2011), pp. 1-25, XP015076456, [retrieved on Jun. 15, 2011].

European Search Report application No. 14727813.9 dated Jun. 15, 2018.

International Search Report and Written Opinion dated Feb. 13, 2015 corresponding to International Patent Application No. PCT/EP2014/061325.

C. Perkins, "IP Mobility Support," Network Working Group, RFC 2002, Oct. 1, 1996, XP015007786, 79 pages.

3GPP TR 36.842 V1.0.0 (Nov. 2013), Technical Report, 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), Nov. 26, 2013, 68 pages.

3GPP TS 23.402 V12.4.0 (Mar. 2014), Technical Specification, 3rd Generation Partnership Project; Technical Specification Group Services and System Aspects; Architecture enhancements for non-3GPP accesses (Release 12), Mar. 10, 2014, 288 pages.

A. Ford et al.: "TCP Extensions for Multipath Operation with Multiple Addresses," Internet Engineering Task Force (IETF), RFC 6824, Jan. 1, 2013, 64 pages.

C. Raiciu et al.: "Coupled Congestion Control for Multipath Transport Protocols," Internet Engineering Task Force (IETF), RFC 6356, Oct. 1, 2011, 12 pages.

H. Soliman, "Mobile IPv6 Support for Dual Stack Hosts and Routers," Network Working Group, RFC 5555, Jun. 1, 2009, 41 pages.

Chinese Office Action corresponding to Chinese Application No. 201480080981.3, dated Jul. 25, 2019.

Chinese Office Action corresponding to CN Application No. 201480080981.3, dated Sep. 24, 2020.

* cited by examiner

MULTIPATH TCP WITH LTE CONNECTIONS

FIELD OF THE INVENTION

The present invention relates to an apparatus, a method, and a computer program product related to data communication. More particularly, the present invention relates to an apparatus, a method, and a computer program product related to multipath TCP with dual LTE connections.

BACKGROUND OF THE INVENTION

Abbreviations

3GPP Third Generation Partnership Project
ANDSF Access Network Discovery and Selection Function
AP Access Point, e.g. a radio node in a Wi-Fi network
APN Access Point Name
CN Core Network
DSMIP Dual Stack Mobile IP
eNB evolved NodeB, LTE (EUTRAN) base station
EPC Evolved packet Core
EPS Evolved Packet System
E-RAB EUTRAN Radio Access Bearer
EUTRA Evolved UTRA
EUTRAN EUTRA network
IETF Internet Engineering Task Force
IFOM IP Flow Mobility
IP Internet Protocol
GPRS General Packet Radio Service
GTP GPRS Tunnelling Protocol
GTP-u GTP User plane
GW Gateway
LTE Long Term Evolution
MeNB Master eNB
MCG Master Cell Group
MME Mobility Management Entity
MPTCP Multipath TCP
NW Network
P-GW PDN Gateway
PDN Packet Data Network
PLMN Public Land Mobile Network
QoS Quality of Service
RA Radio Access
RAN Radio Access Network
RAT Radio Access Technology
Rel Release (e.g. version of a 3GPP standard specification)
RFC Request for Comments (IETF specification)
S1-u S1 tunnelling interface (typically uses GTP-u)
SCG Secondary Cell Group
SeNB Secondary eNB
S-GW Serving Gateway
TCP Transmission Control Protocol
TR Technical Report
TS Technical Specification
UE User Equipment
UMTS Universal Mobile Telecommunications System
UTRA UMTS Terrestrial Radio Access
UTRAN UTRA network
VoLTE Voice over LTE
Wi-Fi Wireless Fidelity, e.g. defined by IEEE802.11 specifications and/or certified by Wi-Fi Alliance
WLAN Wireless Local Area Network (also named Wi-Fi)

The present application relates to the 3GPP connectivity and multipath TCP (MPTCP) transport. 3GPP connectivity is defined to provide EPS bearer services to a User Equipment (UE) over a radio access network (RAN). EPS connectivity is capable of granting an IP address or multiple IP addresses to a UE, in order the UE to connect to the internet.

In addition to the 3GPP connectivity, UE may also have WLAN connectivity to the Internet. 3GPP has taken into account the wide-ranging availability of WLAN access and has therefore defined specifications for multi-access connectivity over the 3GPP and non-3GPP accesses, in 3GPP TS 23.402. The multi-access connectivity over a 3GPP radio access and over a non-3GPP access in parallel can be used for IP subflows of MPTCP if and only if two different IP addresses are granted to the UE, one of which is served by the 3GPP EPS bearer and the other one is served by the non-3GPP access (typically assumed to be the WLAN).

In 3GPP release 12 study on small cell enhancements for EUTRA and EUTRAN, dual connectivity is described as a solution to serve UE from macro cells and from smaller cells at the same time. The study identifies multiple architectural alternatives, from which option 1A and option 3C were decided to be standardized in the work item, yet in release 12 schedule. The dual connectivity architecture defines connectivity using two network nodes at the same time. This allows connectivity via two different cell layers (for example macro cell and micro cell), however it as well allows connectivity via two network nodes of equal cell size.

Architecture 1A provides full radio stacks for a UE in both the Master eNB (MeNB) and in the Secondary eNB (SeNB). The MeNB serves possibly multiple cells on multiple carriers in a carrier aggregation manner in the Master Cell Group (MCG) and the SeNB serves possibly multiple cells on multiple carriers in a carrier aggregation manner in the Secondary Cell Group (SCG). Option 1A also defines separate and fully independent EUTRAN Radio Access Bearers (E-RAB) between the MeNB and the serving/PDN gateway and between the SeNB and the serving/PDN gateway. Architecture 1A therefore allows serving one set of EPS bearers via the MeNB and another set of EPS bearers via the SeNB.

The current 3GPP specifications support UE (multi-radio capable terminal) having multi-access connectivity, which means that the UE is using the 3GPP cellular connection and the WLAN access (Wi-Fi) connection to the Gateway in the Core Network (EPC). Depending on the IP architecture in the network, there may be a Home Agent located with the gateway. It is common that 3GPP cellular connection and WLAN access connection use different IP addresses, however techniques exist, which preserve the same IP address when moving traffic flows between the 3GPP access and the WLAN access.

The IFOM (IP Flow Mobility) feature allows seamless offloading from cellular connection to WLAN connection with IP flow granularity rather than with only PDN granularity.

- IP flow is any traffic from an application e.g. voice or video or email. A PDN connection may have multiple IP flows
- Each IP flow belonging to a single PDN connection may be transferred through different, selected access network
- Multi-access PDN connection requires a PDN to be connected through two different access networks simultaneously
- In IFOM, UE is using two access networks for the same PDN connection
- In IFOM, IP flows can be modified, deleted, moved between the access networks.

FIG. 1 shows IP Flow Mobility according to 3GPP Rel-10. On the left side, a terminal is shown. The terminal may have received an ANDSF policy from the network, the policy of which provides a network discovery and selection function. The UE selects from the ANDSF policy rules, a valid rule to respect in its network selection. ANDSF may provide seamless authentication. In addition, as shown on the top, it has client or network based flow mobility, wherein the routing is based on the IP flow.

The terminal is connected to the core network shown on the right, which may be represented e.g. by a gateway or a home agent via a cellular (3GPP) network (shown on top) and a WiFi network shown at the bottom. The IP flow via the cellular network goes through the base station and a serving gateway (e.g. SGSN) to the Packet Data Network (PDN) gateway in the core network. The IP flow through the Wi-Fi network goes through the WLAN AP to the PDN gateway in the core network. In parallel to the respective IP traffic flows, signalling for connectivity management, PDN management and client IP mobility is exchanged between the terminal and the core network. Between SGSN and core network and between the Packet data network and the core network, signalling for network IP mobility is added.

As the multi-access PDN connectivity, like IFOM, associates a PDN connection with two access networks simultaneously, the UE may establish a Multi Path TCP (MPTCP) connection in order to split TCP data transfer between cellular access and WLAN access to multiple subpaths (IP paths) between the UE and a server.

The 3GPP-WLAN multi-access has problematic aspects, because the Wi-Fi network is separate from 3GPP networks and because it works quite differently, especially in its timing, signalling and handling of the radio connection. For example, the network control of radio resources and quality (QoS) over WLAN connection is very limited when compared with the cellular connection where the bearer services with QoS are supported. Even more seriously, all the operational principles and parameters of WLAN are completely different from the 3GPP cellular system. In WLAN, there are no guarantees how the WLAN connection operates, because it targets at best effort serving of devices and their traffic flows i.e. the service level may vary heavily depending on the loading and depending on the served device. In particular, this behaviour of WLAN is not controllable with any mechanisms being comparable to the operational principles of the 3GPP cellular access, even if these were in use simultaneously.

The small cell architecture enhancement defined in 3GPP TR36.842 and being specified in release 12 as option 1A supports LTE dual connectivity via a Master eNB (MeNB) and a Secondary eNB (SeNB) having EPS bearer services using MeNB bearers and other EPS bearer services using SeNB bearers. LTE dual connectivity in TR36.842 does not define any requirements for the PDN connectivity, and it describes: "dual connectivity refers to operation where a given UE consumes radio resources provided by at least two different network points connected with non-ideal backhaul." Hence, each EPS bearer may be served from the MeNB or from the SeNB, while other EPS bearers may at the same time be served by either the MeNB or the SeNB.

A served EPS bearer may be switched from being served by the MeNB to the SeNB or vice versa from being served by the SeNB to the MeNB. It is possible to reconfigure the connection to have a serving MeNB and a serving SeNB simultaneously, i.e. operating in dual connectivity, and to reconfigure to drop another serving node and change to single connectivity. From each eNB, the UE may be served by multiple radio cells i.e. on multiple component carriers. This is valid for both the dual connectivity and the single connectivity. In PDN connection, both the EPS bearers served by the MeNB and the EPS bearers served by the SeNB have transport bearers to the serving gateway (S-GW) and further to the PDN gateway (P-GW), which are logically located in the evolved packet core network (EPC). It is feasible to assign different serving gateways for the bearers served by the MeNB and served by the SeNB, which however complicates EPS bearer handling and is therefore not the most preferred embodiment. On the other hand, integrating the S-GW functionality to a P-GW is a recognized implementation opportunity, which also suits for the dual connectivity architecture.

FIG. 2 shows the small cell Architecture option 1A according to 3GPP TR36.842 including the respective interfaces. The terminal (UE) is connected via Uu interface with the MeNB and with the SeNB, which may be part of a group of small cells. Each of these eNBs is connected to S-GW via a S1-U user plane interface, whereas the MeNB is additionally connected via S1-MME control plane interface to the Mobility Management entity (MME). The serving MeNB and SeNB are connected to each other via a Xn-C control plane interface. S1-U operating in user plane may be configured to carry control plane signalling messages (e.g. piggybacked).

The LTE dual connectivity with different data paths to the S-GW/P-GW applies one PDN connection and separates EPS bearer services for each data path within this PDN connection. This enables e.g. to keep the VoLTE bearer using MeNB connection and to offload a best effort data bearer via the SeNB connection. Having multiple data bearers allows some of them be served by the MeNB and others of them be served by the SeNB.

"Link Model for Multi-Prefix EPS Bearer" (WO 2013/083189) issued a mechanism to support IPv6 multi-homing by allowing to use multiple IPv6 prefixes over a single PDN connection. According to this application, ordinary EPS bearer services are supported via a P-GW and possible additional Local IP Breakout services from the S-GW and the eNB by using co-located L-GW i.e. having multiple IP points of attachments each using different IPv6 prefix on the single data path (UE-eNB-S-GW-P-GW).

MPTCP is specified by IETF in RFC6824 as TCP extensions for Multipath Operation with Multiple Addresses, in January 2013. The architecture, connection management, subflow handling and coupled congestion control (RFC6356) are defined in IP layer and above. MPTCP stack, as shown in RFC6824 and replicated in FIG. 3, is different from the conventional TCP/IP stack.

An Access Point Name (APN) is a name of a gateway between a mobile network and another computer network, such as the Internet. APN may consist of network identifier and operator identifier. Network identifier defines to which external network the access network is connected to, via the PDN gateway (P-GW) of an operator. Operator identifier defines in which network the gateway is located (for example it may be the PLMN of an operator or it may be an Internet service provider).

SUMMARY OF THE INVENTION

It is an object of the present invention to improve the prior art.

According to a first aspect of the invention, there is provided an apparatus, comprising configuring means adapted to configure a first internet protocol address and a second internet protocol address different from the first internet protocol address for a connection between the apparatus and a packet data network; assigning means adapted to assign the first internet protocol address to a first data path for the connection and to assign the second internet protocol address to a second data path for the connection, wherein at least a part of the first data path belongs to a radio access technology; at least a part of the second data path belongs to the radio access technology; and the part of the first data path is different from the part of the second data path.

The part of the first data path may be via a first base station and the part of the second data path may be via a second base station different from the first base station. The first base station may be a master base station and the second base station may be a secondary base station of a dual-connectivity architecture.

The part of the first data path may belong to a radio access network and the part of the second data path may belong to the radio access network, too. The part of the first data path may belong to a first cell layer of the radio access network and the part of the second data path may belong to a second cell layer of the radio access network, wherein the first cell layer is different from the second cell layer.

The apparatus may further comprise signaling means adapted to signal a mapping information, wherein the mapping information comprises a mapping of the first internet protocol address to the first data path and of the second internet protocol address to the second data path.

The radio access technology may be a third generation partnership project radio access technology.

The apparatus may further comprise routing means adapted to route an uplink traffic via at least one of the first data path and the second data path.

According to a second aspect of the invention, there is provided an apparatus, comprising configuring circuitry configured to configure a first internet protocol address and a second internet protocol address different from the first internet protocol address for a connection between the apparatus and a packet data network; assigning circuitry configured to assign the first internet protocol address to a first data path for the connection and to assign the second internet protocol address to a second data path for the connection, wherein at least a part of the first data path belongs to a radio access technology; at least a part of the second data path belongs to the radio access technology; and the part of the first data path is different from the part of the second data path.

The part of the first data path may be via a first base station and the part of the second data path may be via a second base station different from the first base station. The first base station may be a master base station and the second base station may be a secondary base station of a dual-connectivity architecture.

The part of the first data path may belong to a radio access network and the part of the second data path may belong to the radio access network, too. The part of the first data path may belong to a first cell layer of the radio access network and the part of the second data path may belong to a second cell layer of the radio access network, wherein the first cell layer is different from the second cell layer.

The apparatus may further comprise signaling circuitry configured to signal a mapping information, wherein the mapping information comprises a mapping of the first internet protocol address to the first data path and of the second internet protocol address to the second data path.

The radio access technology may be a third generation partnership project radio access technology.

The apparatus may further comprise routing circuitry configured to route an uplink traffic via at least one of the first data path and the second data path.

According to a third aspect of the invention, there is provided an apparatus, comprising identifying means adapted to identify a mapping of a first internet protocol address to a first data path and of a second internet protocol address to a second data path based on a message received from a terminal, wherein the second data path is different from the first data path; assigning means adapted to assign the first internet protocol address to the first data path for a downlink traffic to the terminal and the second internet protocol address to the second data path for the downlink traffic to the terminal.

The message may be received via session management signaling between the terminal and the apparatus.

According to a fourth aspect of the invention, there is provided an apparatus, comprising identifying means adapted to identify a first internet protocol address from a first traffic received via a first data path from a terminal and to identify a second internet protocol address from a second traffic received via a second data path from the terminal, wherein the second data path is different from the first data path; assigning means adapted to assign the first internet protocol address to the first data path for a downlink traffic to the terminal and to assign the second internet protocol address to the second data path for the downlink traffic to the terminal.

The first address may be a source address of the first traffic. The second address may be a source address of the second traffic.

The apparatus according to any of the third and fourth aspects may further comprise routing means adapted to route a received downlink traffic to the terminal via at least one of the first data path and the second data path.

According to a fifth aspect of the invention, there is provided an apparatus, comprising identifying circuitry configured to identify a mapping of a first internet protocol address to a first data path and of a second internet protocol address to a second data path based on a message received from a terminal, wherein the second data path is different from the first data path; assigning circuitry configured to assign the first internet protocol address to the first data path for a downlink traffic to the terminal and the second internet protocol address to the second data path for the downlink traffic to the terminal.

The message may be received via session management signaling between the terminal and the apparatus.

According to a sixth aspect of the invention, there is provided an apparatus, comprising identifying circuitry configured to identify a first internet protocol address from a first traffic received via a first data path from a terminal and to identify a second internet protocol address from a second traffic received via a second data path from the terminal, wherein the second data path is different from the first data path; assigning circuitry configured to assign the first internet protocol address to the first data path for a downlink traffic to the terminal and to assign the second internet protocol address to the second data path for the downlink traffic to the terminal.

The first address may be a source address of the first traffic. The second address may be a source address of the second traffic.

The apparatus according to any of the fifth and sixth aspects may further comprise routing circuitry configured to route a received downlink traffic to the terminal via at least one of the first data path and the second data path.

According to a seventh aspect of the invention, there is provided a method, comprising configuring a first internet protocol address and a second internet protocol address different from the first internet protocol address for a connection between an apparatus performing the method and a packet data network; assigning the first internet protocol address to a first data path for the connection and to assign the second internet protocol address to a second data path for the connection, wherein at least a part of the first data path belongs to a radio access technology; at least a part of the second data path belongs to the radio access technology; and the part of the first data path is different from the part of the second data path.

The part of the first data path may be via a first base station and the part of the second data path may be via a second base station different from the first base station. The first base station may be a master base station and the second base station may be a secondary base station of a dual-connectivity architecture.

The part of the first data path may belong to a radio access network and the part of the second data path may belong to the radio access network. The part of the first data path may belong to a first cell layer of the radio access network and the part of the second data path may belong to a second cell layer of the radio access network, wherein the first cell layer is different from the second cell layer.

The method may further comprise signaling a mapping information, wherein the mapping information comprises a mapping of the first internet protocol address to the first data path and of the second internet protocol address to the second data path.

The radio access technology may be a third generation partnership project radio access technology.

The method may further comprise routing an uplink traffic via at least one of the first data path and the second data path.

According to an eighth aspect of the invention, there is provided a method, comprising identifying a mapping of a first internet protocol address to a first data path and of a second internet protocol address to a second data path based on a message received from a terminal, wherein the second data path is different from the first data path; assigning the first internet protocol address to the first data path for a downlink traffic to the terminal and the second internet protocol address to the second data path for the downlink traffic to the terminal.

The message may be received via session management signaling between the terminal and an apparatus performing the method.

According to a ninth aspect of the invention, there is provided a method, comprising identifying a first internet protocol address from a first traffic received via a first data path from a terminal and to identify a second internet protocol address from a second traffic received via a second data path from the terminal, wherein the second data path is different from the first data path; assigning the first internet protocol address to the first data path for a downlink traffic to the terminal and to assign the second internet protocol address to the second data path for the downlink traffic to the terminal.

The first address may be a source address of the first traffic. The second address may be a source address of the second traffic.

The method may further comprise routing a received downlink traffic to the terminal via at least one of the first data path and the second data path.

The method according to each of the seventh to ninth aspects may be a method of multipath TCP.

According to a tenth aspect of the invention, there is provided a computer program product comprising a set of instructions which, when executed on an apparatus, is configured to cause the apparatus to carry out the method according to any one of the seventh to ninth aspects. The computer program product may be embodied as a computer-readable medium or directly loadable into a computer.

According to some embodiments of the invention, at least one of the following advantages may be achieved:
Multipath TCP may be provided within a 3GPP network;
Networking is under better control of the 3GPP EPC, which would be useful e.g. to provide QoS;
Radio accesses are in better control of the 3GPP RAN (unlike with WLAN);
Radio resource allocations are in control of the 3GPP RAN;
Robustness of the radio access is enhanced;
Capacity on the radio access may be assigned according to the needs;
Load balancing may be achieved.

Hereinabove, for some embodiments of the invention, "better control" means that the respective item is under control of the 3GPP RAN as much as it is not under control of the terminal. Insofar, "better control" may be considered as "full control" as far as the network side is involved.

In detail, making multi-access by the same 3GPP technology, i.e. using macro network and using a separate small cell layer, networking would be in much better control of the 3GPP EPC, compared to multi-access by 3GPP and non-3GPP (WLAN) accesses. The control of radio resources may be kept in the MeNB, which configures master cell group and small cell group for the UE. The network may have full control whether to allow the secondary cell group (SCG) or not, and how to configure the cell resources for a UE. Also from the UE point of view, functional optimization for operation in two accesses of the same technology may have benefits compared to operation in two different access technologies such as 3GPP and WLAN. That is, better control of UE power resources, optimization of power use depending on the operational state, coordination of the timing of actions etc. are feasible when having the same access technology in use compared to running two accesses operating with differing principles and parameters.

From MPTCP point of view, having two IP addresses for the 3GPP access over two different cell layers, both MPTCP paths would be in full control of the operator, but yet maintaining the multipath benefits on the IP layer, serving the common TCP entity and layers above the TCP ports.

MPTCP run in this way allows throughput increase, better link robustness, (automatic) balancing of load over the two paths and in addition, a joint congestion (TCP) algorithm. The mentioned benefits over the two paths are met over the radio links of the paths and over the transport interfaces of the paths, which even further accumulates the benefits. Even better, it may automatically tolerate drop of the other path. If e.g. coverage by the small cell ends or gets weaker it does not have any dramatic impact to the TCP connection (or an application above it) other than decreasing the throughput closer to a conventional TCP used in that case over the stronger remaining path. In contrast to that, if in this case a conventional TCP runs over the small cell, coverage ending or weakening could result in a TCP connection drop.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1:
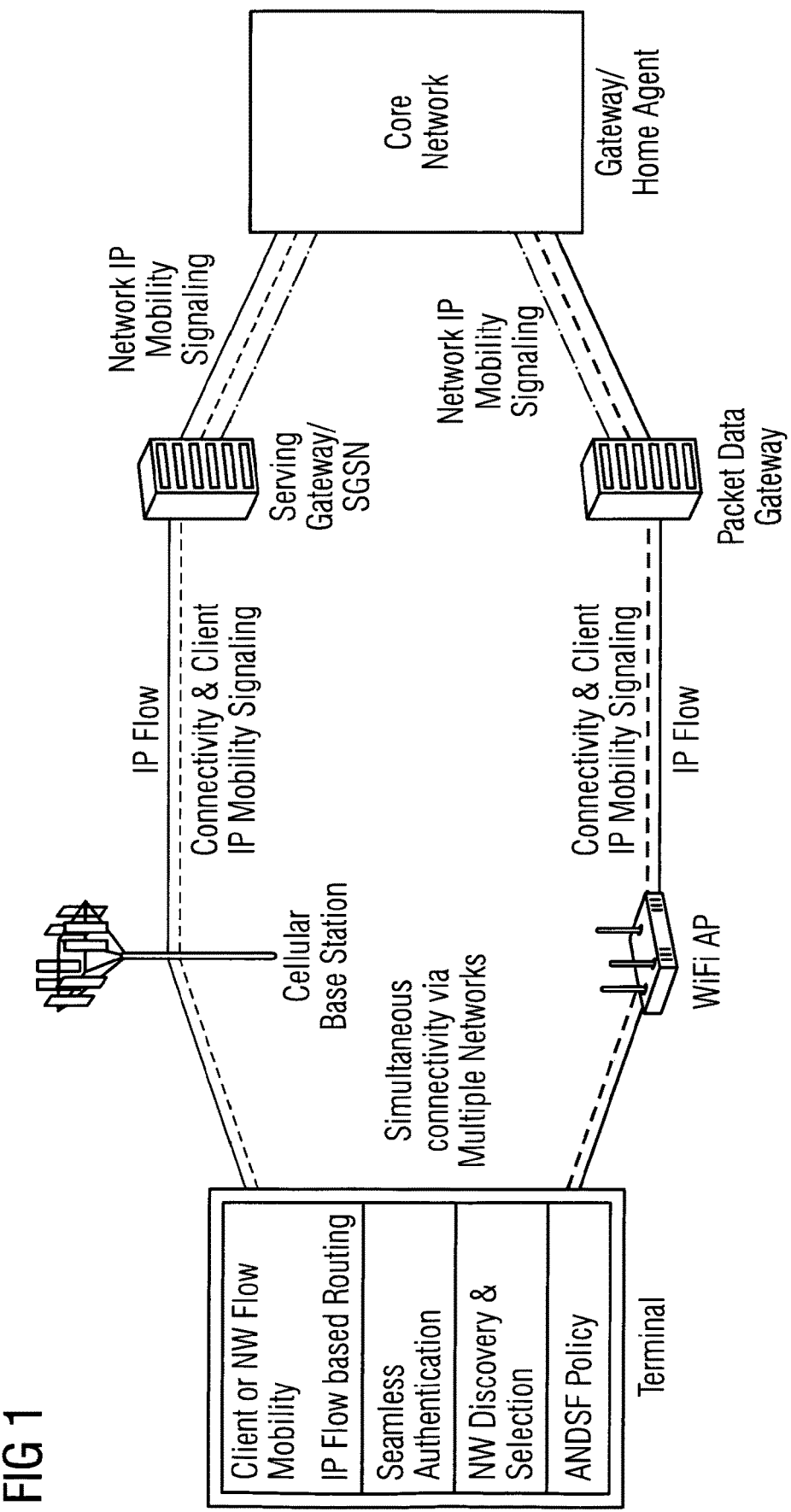
FIG. 1 shows IP Flow Mobility according to 3GPP Rel-10.
Figure 2:
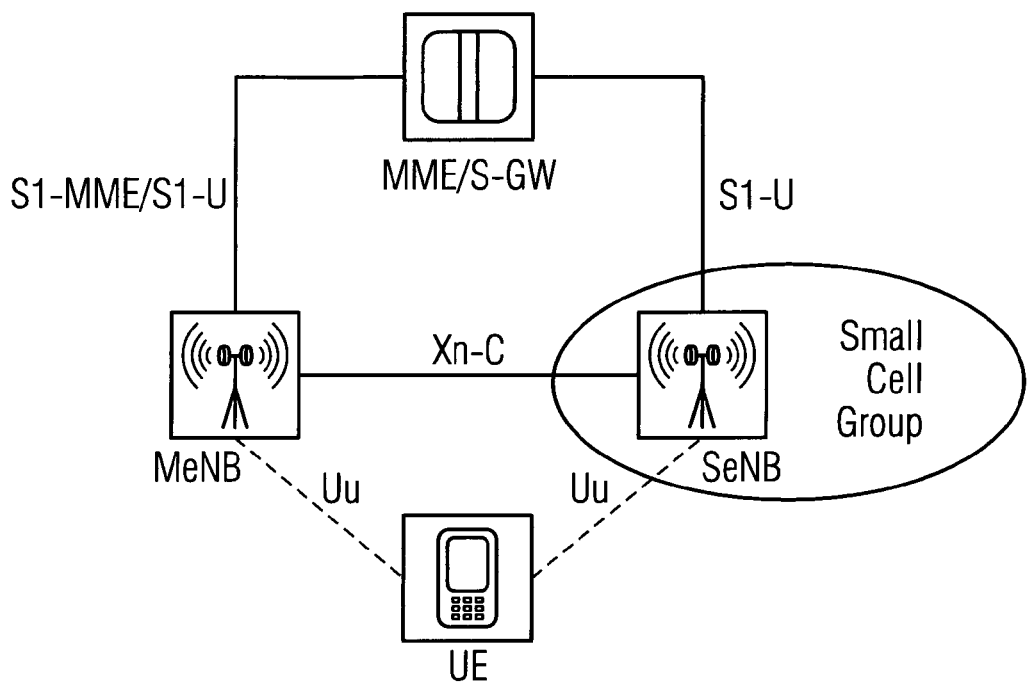
FIG. 2 shows the small cell Architecture option 1A according to 3GPP TR36.842.
Figure 3:
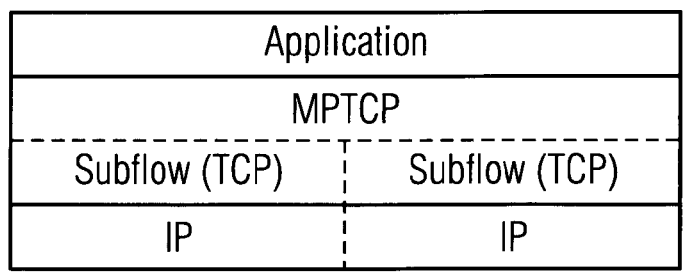
FIG. 3 shows a MPTCP stack according to RFC6824.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Embodiments of the invention provide solutions, which make it possible to use the MeNB access and the SeNB access for dual connectivity, not only in the radio bearer services but additionally also in the IP connectivity. Thus, MPTCP may run over two subflows, one over the MeNB access path and the other over the SeNB access path Intra-LTE access dual connectivity as described in the prior art section (e.g. option 1A of 3GPP TR36.842) does not support UE to use MPTCP because a point-to-point link model having just a single IPv6 prefix over a PDN connection is assumed and UE is assumed to use the same IPv6 address for all the EPS bearers within a PDN connection. For MPTCP protocol, the UE needs to have two IP addresses that are usable between the client and the server. Note that the IP version in some embodiments of the invention may be IP version 4 or IP version 6. Furthermore, some embodiments cover a dual-stack implementation, where the UE may be served either in IPv4 or IPv6 address formats and protocols accordingly. It is noteworthy that IPv6 protocols offer much larger set of networking protocol properties compared to IPv4. Yet, IPv4 is recognized to be widely in use.

The current 3GPP specified IP link model follows the point-to-point IP attachment paradigm. There is a limitation that just a single IPv6 prefix within a PDN connection is allowed. On the other hand, an IPv6 multi-homing UE may establish another PDN connection. Multi-homing means that UE is granted multiple independent addressable IP addresses to be valid simultaneously. According to some embodiments of this invention, the UE may, for this reason, request from the 3GPP P-GW multiple IP address for the establishment of multiple PDN connections, each connection having an own IP address. The P-GW may grant and assign UE, at the UE request, multiple PDN connections and multiple IP addresses. In this manner, the limitation of the prior art is overcome.

According to some embodiments of the invention, these PDN connections may be created by a single P-GW, and these PDN connections may belong to the same Access Point Name (APN). Some embodiments of the invention may involve another P-GW that provides connectivity to another IPv6 network by using another IPv6 address accordingly. In such an embodiment, the PDN connections may belong to the same APN or they may belong to different APNs. In case belonging to different APNs, these APNs favourably are of the same kind, e.g. as "Internet APN".

As described hereinabove, conventionally a PDN connection may have assigned multiple IPv6 addresses with different prefixes, but the UE cannot use MPTCP because all the related EPS bearer services use the same radio interface in the UE. Therefore, the UE sees just a single IP data path.

The benefits of MPTCP are achievable if different routing paths between the source and destination can be provided. For end-to-end paths which include wireless access (last mile) between the client and the server, the radio access network is typically the critical section along the path in terms of bandwidth, delay and link robustness. If multi-access radio connections cannot be provided for a wireless device, when MPTCP is used, the multipath benefits are limited to the fixed network transport section.

According to some embodiments of the invention, the small cell architecture enhancement option 1A in 3GPP supports LTE dual connectivity via two base stations such as a Master eNB (MeNB) and a Secondary eNB (SeNB). In these embodiments, the UE sees two radio interfaces and two data paths. The bearers served by MeNB and the bearers served by SeNB are separate, and according to the invention they need to be coupled together in order to serve a MPTCP connection. According to some embodiments of the invention, these bearers serve different PDN connections, the PDN connections of which have a different IP point of attachment, i.e. they are served by a different IP address.

In some embodiments of the invention, the default EPS bearer is via the MeNB as the primary data path, and, when available and/or required (e.g. because of capacity requirements), an additional "booster" EPS bearer is via the SeNB as the secondary data path. Thus, a MPTCP connection is set up over these bearers.

In some embodiments of the invention, two default EPS bearers are provided, one via the MeNB and the other one when available and/or required via the SeNB.

In order to operate the MPTCP, the UE uses different IPv6 addresses for each interface/data path, so that UE uses multiple IPv6 addresses within a single PDN connection. In particular, if the UE desires a MPTCP connection, or MPTCP connections, the UE may request and thereafter configure different IPv6 addresses to the default EPS bearer and to the "booster" EPS bearer. UE may also use two bearers of type "default EPS bearer". When using the booster bearer, its bearer parameters, for example quality of service parameters, may be the same as the parameters of the default EPS bearer or different from the parameters of the default EPS bearer. When using two default EPS bearer types, their parameters may be equal or they may be different. In some embodiments of the invention, a booster bearer may inherit some or all of the bearer parameters from the default EPS bearer. In this manner, the booster bearer yet provides boosting, because it uses different radio resources, capacity and a different data path than the default EPS bearer in dual connectivity. In contrast to that, conventionally, a booster bearer having the same parameters as the default bearer would not boost because it uses the same resources as the default bearer.

One more option to support MPTCP according to some embodiments of the invention is to let the UE assign multiple IPv6 addresses from the address range that belongs to the single IPv6/64 prefix associated to a PDN connection. The UE has available a huge amount of IPv6 interface identifiers that are usually meant for hosts using the UE (or its LTE modem) as a router. In these embodiments, some of the IPv6 interface identifiers are used to identify different data paths to the PDN instead.

According to some embodiments of the invention, the UE may request IP addresses intended to be used for MPTCP connection. According to some embodiments of the invention, the P-GW may associate an IPv6 address for each EPS bearer service by a session management signalling. If association of IP addresses to each EPS bearer service is done in another network element than the P-GW, P-GW may be informed about the associated IPv6 address for each EPS bearer service by the session management signalling, respectively.

As another option according to some embodiments of the invention, the P-GW may learn the mappings of IP addresses to EPS bearer mappings based on the user uplink traffic, e.g. by a Traffic Flow Template. That is, the P-GW may identify the source IP address, which the UE selected to be used out of its several available IP addresses for a particular uplink request or a particular kind of uplink traffic and memorize the correlation of each IP address to each data path (including the respective EPS bearer service).

Since P-GW thus knows about the IP addresses and data paths, the P-GW is enabled to route user traffic having the destination IP address of the UE set to the source address of the request or the uplink traffic, to the correct EPS bearer in reverse direction (in downlink). Having MPTCP connection set up with multiple subflows, the TCP algorithms and protocols guide, how the traffic written to a single TCP port is using the available IP addresses (of the MPTCP/IP socket), which maps the traffic to different transmission paths. The MPTCP port may use the IP data paths in a balanced and efficient way, according to the MPTCP algorithms and their state variables. Hence, a traffic of a TCP port may use both IP data paths simultaneously or may more heavily use one IP data path and less the other data path at a time, and then increase the use of less congested data path more than the other possibly more congested data path. It is also feasible, while having MPTCP connection, to use one IP data path only and then alternating from one data path to the other data path, if convenient. The use of data paths is based on algorithms jointly evaluating the use of the data paths.

For pushed downlink communications (which are not in response to an uplink communication), the sender knows the IP address, protocol (e.g. UDP) and a port number of the receiver (e.g. the terminal) where it is listening to push type messages. The latter two are typically well known. The sender resolves receiver node IP address, e.g. using an address resolving server such as a call control server, where UE has registered with its host name or a human friendly name, its availability, and its current IP address. Thus, UE determines the data path for a certain push type message by its registration at the address resolving server. Since the current IP address is associated to one of the EPS bearer services and, thus, to one of the data paths between P-GW and UE, P-GW is informed about the data path to use for the respective pushed downlink traffic.

The UE may set up a MPTCP connection with a server, when both of them support MPTCP connection. MPTCP first executes the initial TCP connection setup using one IP address and then it further sets up additional subflows to use the other IP address(es) to form a MPTCP connection. Once having the MPTCP connection running over two (or more) IP addresses, over the two (or more) bearers, the MPTCP protocol and algorithms define how to use these IP subflows for a traffic, in a joint-optimal manner. In some embodiments, LTE EPC need not control this mapping, if it just enables the use of multiple IP addresses over different data paths, in dual connectivity. When RAN decides on resource sharing and scheduling, depending e.g. on the resources available, on the UE location in the cell, on the cell load and carrier load and interference situation respectively in the MeNB and SeNB, the MPTCP may experience data path characteristics due to cellular behaviour of MeNB and SeNB, and in addition due to the characteristics of their fixed network transport paths. MPTCP algorithms need not be aware of this dual connectivity mapping, neither does the dual connectivity mapping need to be aware of MPTCP, because the MPCTP operates in the end-nodes and works entirely based on the overall data path characteristics like the bandwidth and delay perception. These data path characteristics may change dynamically. The MPCTP protocol perceives the path properties e.g. by the Acknowledgement (MPTCP ACK), which is created at the MPTCP destination and received from there back to the MPTCP source.

In some embodiments of the invention, the UE is enabled to configure the Interface Identifier portion of the IPv6 address freely per each EPS bearer and/or the P-GW routes data traffic according to the source IPv6 address the UE is using for each EPS bearer. In another embodiment, UE makes a request for this and P-GW configures it accordingly. In both embodiments, there is a mapping of one bearer to one IP address, the bearers of which need to be served by different MCG and SCG data paths/resources, and the IP addresses of which need to be (differently) routable addresses. The benefits of the invention are reduced, if the bearers are not mapped to different MCG and SCG data paths/resources but to the same MCG or SCG. The benefits of the invention are reduced if the IP addresses are not differently routable addresses. However, in both cases, there may still remain some benefits e.g. in terms of boosting.

On the other hand, for example, if the aforementioned preferred conditions are met, the UE may benefit from Intra LTE dual connectivity by establishing MPTCP connections transparently to the 3GPP network.

Figure 4:
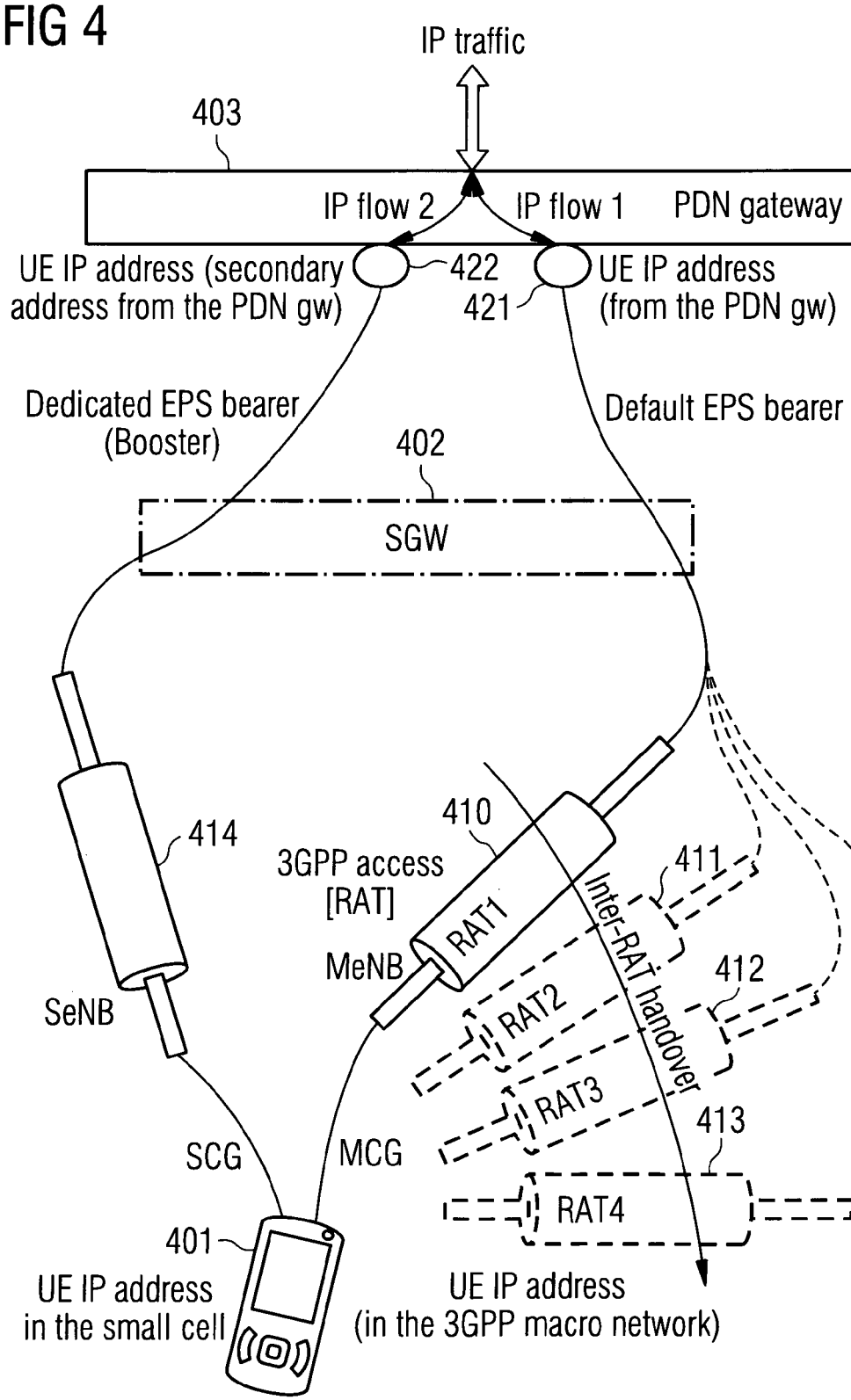
FIG. 4 shows a system according to an embodiment of the invention.

FIG. 4 shows a system according to some embodiments of the invention. It shows at the bottom a terminal (UE) 401 and at the top a P-GW 403 which may have IP traffic to the outside such as to the internet. Between the P-GW and the terminal is the S-GW 402.

On the right side, several 3GPP RATs 410 to 413 are indicated (e.g. LTE, WCDMA/HSPA, GERAN, or their different carriers on different frequency bands) which the terminal may use to connect to P-GW via S-GW. Inter-RAT handover may take place between these RATs. In some embodiments of the invention, the terminal may not connect to another RAT than 3GPP defined RAT, whereas in some embodiments it may involve cdma2000 RAT or non-3GPP RAT (e.g. interworking Wi-Fi). In some embodiments, the terminal may connect to a single RAT (in particular: a single 3GPP RAT) only.

One of the RATs (RAT 410) is a 3GPP access over a MeNB (or a MCG). In the macro network to which MeNB belongs, the terminal 401 has a first IP address. This first IP address is associated to IP flow 1 421 in the P-GW, which corresponds to the data path via MCG. In this embodiment, this path is a default data path.

In addition, as shown on the left side, there is a data path 414 from the terminal via SeNB (SCG) and S-GW to P-GW. A second IP address (secondary IP address) different from the first IP address is associated to the terminal on this data path. Correspondingly, the second IP address is associated to IP flow 2 422 in the P-GW, which corresponds to the data path via SCG. In this embodiment, this path is a booster for the default path (a dedicated EPS bearer). The IP flows 1 and 2 may form subflows of a MPTCP connection.

Figure 5:
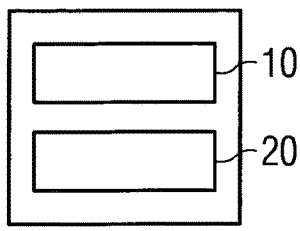
FIG. 5 shows an apparatus according to an embodiment of the invention.
Figure 6:
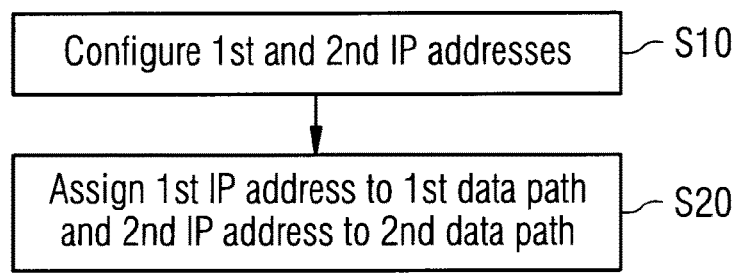
FIG. 6 shows a method according to an embodiment of the invention.

FIG. 5 shows an apparatus according to an embodiment of the invention. The apparatus may be a terminal such as a UE, or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises configuring means 10, and assigning means 20.

The configuring means 10 configures a first internet protocol address and a second internet protocol address for a connection between the apparatus and a packet data network (S10). In some embodiments, the UE may request the IP configurations for a first IP address and a second IP address, and receives the IP configurations for these respectively. The assigning means 20 assigns the first internet protocol address to a first data path for the connection and assigns the second internet protocol address to a second data path for the connection (S20). The second internet protocol address is different from the first internet protocol address. Both the first data path and the second data path comprise a respective part (radio part) belonging to the same radio access technology such as a 3GPP RAT. However, the radio part of the first data is different from the radio part of the second data path. The respective radio parts may be those parts of first and second data paths closest to the apparatus. I.e., the apparatus may be connected via the respective radio part to the rest of the data path or directly to the packet data network.

Figure 7:
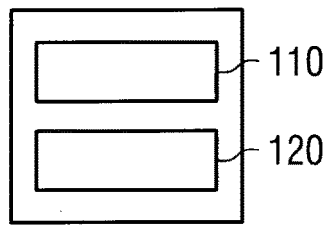
FIG. 7 shows an apparatus according to an embodiment of the invention.
Figure 8:
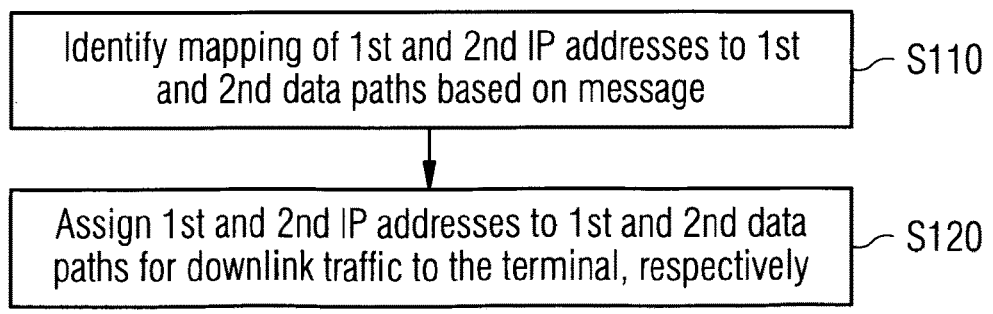
FIG. 8 shows a method according to an embodiment of the invention.

FIG. 7 shows an apparatus according to an embodiment of the invention. The apparatus may be a gateway such as a P-GW, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises an identifying means 110 and an assigning means 120.

The identifying means 110 identifies a mapping of a first internet protocol address to a first data path and of a second internet protocol address to a second data path (S110). The identifying means identifies the mapping based on a message received from a terminal. The second data path is different from the first data path.

The assigning means 120 assigns data paths as data paths to the terminal. Namely, the assigning means 120 assigns the first internet protocol address to the first data path for downlink traffic to the terminal and the second internet protocol address to the second data path for downlink traffic to the terminal (S120).

Figure 9:
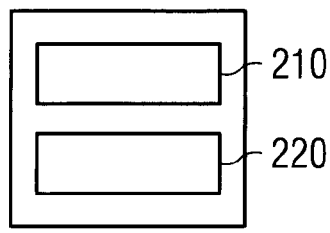
FIG. 9 shows an apparatus according to an embodiment of the invention.
Figure 10:
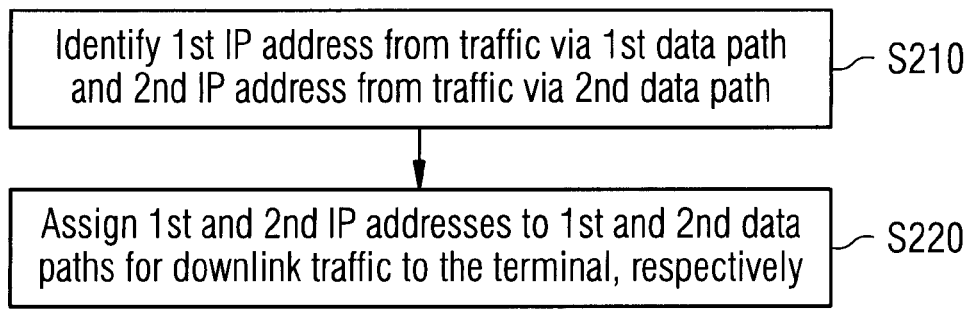
FIG. 10 shows a method according to an embodiment of the invention.

FIG. 9 shows an apparatus according to an embodiment of the invention. The apparatus may be a gateway such as a P-GW, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises identifying means 210 and assigning means 220.

The identifying means 210 identifies a first internet protocol address from a first traffic received via a first data path from a terminal (S210). In addition, the identifying means 210 identifies a second internet protocol address from a second traffic received via a second data path from the terminal (S210). The second data path is different from the first data path.

The assigning means 220 assigns internet protocol addresses to data paths to the terminal. Namely, the assigning means 220 assigns the first internet protocol address to the first data path for downlink traffic to the terminal and the second internet protocol address to the second data path for downlink traffic to the terminal (S220).

Figure 11:
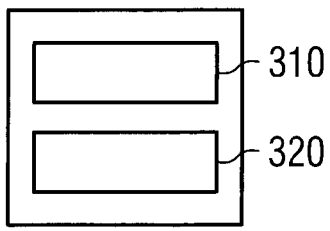
FIG. 11 shows an apparatus according to an embodiment of the invention.

FIG. 11 shows an apparatus according to an embodiment of the invention. The apparatus comprises at least one processor 310, at least one memory 320 including computer program code, and the at least one processor, with the at least one memory and the computer program code, being arranged to cause the apparatus to at least perform at least one of the methods according to FIGS. 6, 8, and 10.

Figure 12:
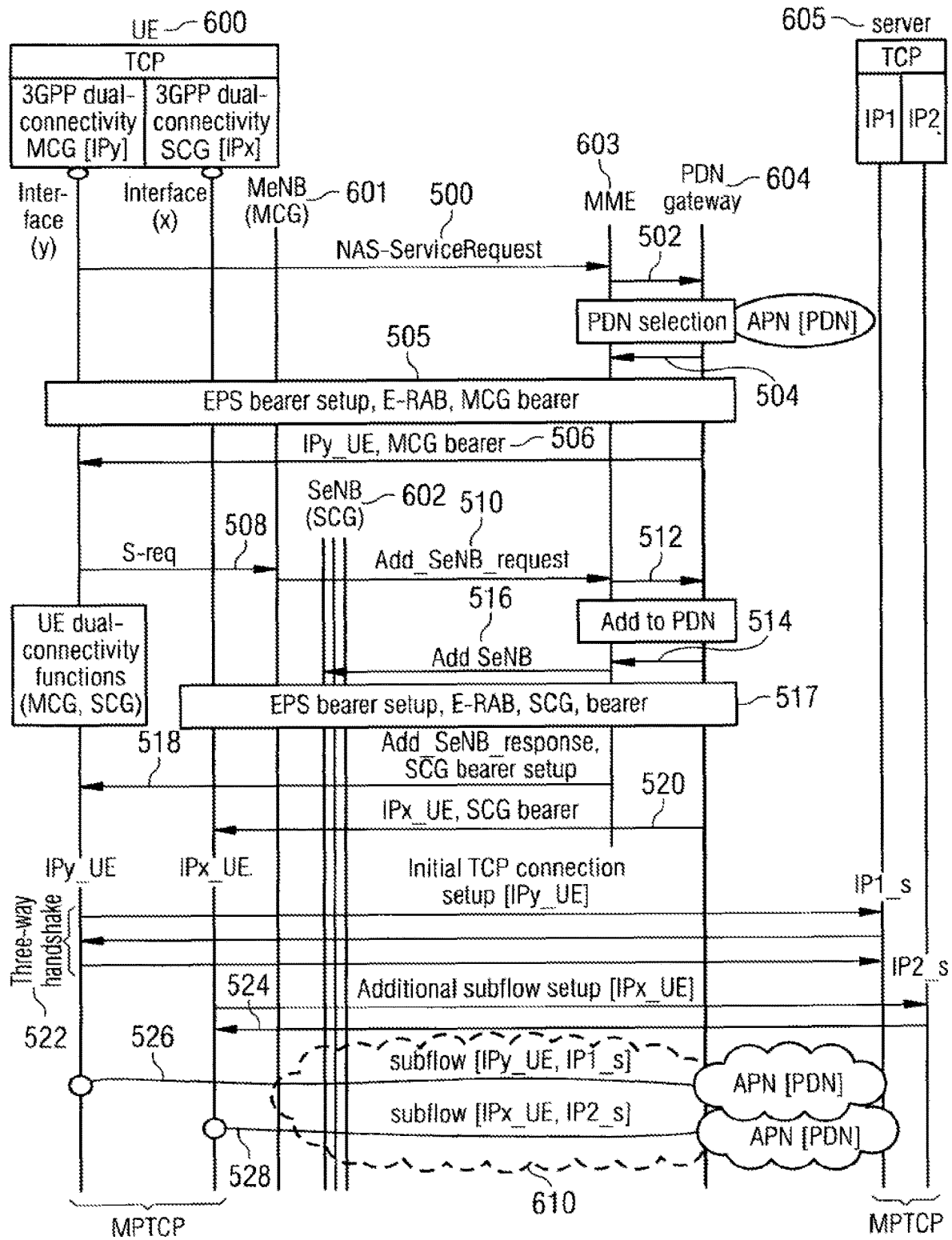
FIG. 12 shows a message flow according to an embodiment of the invention.

FIG. 12 shows a message flow according to an embodiment of the invention.

The UE 600 creates a NAS service request 500 to the EPC, represented for example by MME 603, which selects a PDN gateway 604, possibly from a pool of available PDN gateways (message 502 and response 504). The MME 603 sets up E-RAB bearer for the transport network between a P-GW and a serving MeNB. In step 505, MME further setups an EPS bearer between UE 600 and selected P-GW 604. An EPS bearer may be a combination of an E-RAB and a radio bearer. At least a part of this procedure may be a legacy procedure. However, according to some embodiments of the invention targeting at a dual-connectivity this bearer may have a role of a MCG bearer, i.e. a bearer which is used for the data path via MeNB which offers MCG. With the MCG bearer setup procedure, in message 506, UE gets a unique bearer identity for the MCG bearer and gets an IP address from the P-GW, which may be denoted as IPy_UE hereinafter. Using IPy_UE, a UE may open TCP/IP or UDP/IP port or ports for the use of an application in order to communicate with its source IP address to an application reachable by a destination IP address. UE using its IPy_UE address to communicate to a server is referred to as UE opening an interface (IP interface, marked as interface(y) in FIG. 12).

When a SeNB 602 becomes available for a UE, for example in terms of radio coverage based on UE measurements, the UE may request addition of SeNB 602 to become one of its serving eNBs, hence forming a dual connectivity using both a MeNB and a SeNB as serving eNBs. The request for SeNB addition may be signalled by a UE via the serving MeNB (messages 508, 510). Alternatively, MeNB may get aware of the availability of SeNB 602 by measurement reports. Either of which may initiate SeNB 602 to become added as a UE's serving eNB. In case of dual connectivity, MeNB will send Add_SeNB_request 510 to the EPC, for example represented by MME 603. According to some embodiments of the invention, Add_SeNB_request 510 will trigger a procedure to add the SeNB connectivity to a PDN connection. Messages 512 and 514 between MME 603 and P-GW 604 related to SeNB 602 correspond to messages 502 and 504 for MeNB 601. A serving SeNB may be added to the already established PDN connection, as shown in FIG. 12. This may be described in messages 512 and 514 accordingly. In some embodiments, a new PDN connection may be opened for a SeNB connectivity (not shown separately in FIG. 12). This may be described in messages 512 and 514 accordingly. After addition to a PDN connection (message 512 and response 514), the MME will execute Add_SeNB procedure 516, which will result in an establishment of an E-RAB transport bearer between P-GW 604 and SeNB 602 (517). MME further executes EPS bearer setup to establish 518 a SCG bearer of dual connectivity between UE and a P-GW. The EPS bearer may be a combination of an E-RAB and a radio bearer.

With a SCG bearer setup procedure, UE gets the unique bearer identity for the SCG bearer and gets, by message 520, an IP address from the P-GW, the IP address which is IPx_UE. In message 520, SCG bearer and the use of IPx_UE address may be bind together. Using IPx_UE, UE may open TCP/IP or UDP/IP ports for the use of an application in order to communicate with an application reachable by a destination IP address. UE using its IPx_UE address is referred to as UE opening an interface (IP interface, marked as interface (x) in FIG. 12).

According to some embodiments of the invention, UE may open a MPTCP connection using its IP interfaces, i.e. interface(y) and interface(x), to serve a TCP connection. UE may request a MPTCP connection by first executing a TCP connection setup using its interface(y) (IPy_UE) with a three-way handshake 522 to a server 605 forming a TCP/IP connection using servers' IP address IP1_s. A three-way handshake will result in a TCP connection between source and destination ports of UE 600 and server 605. For MPTCP, UE may initiate an additional (two-way, for example) subflow setup 524 using its IP interface interface(x) (IPx_UE) by informing the server host about a potential address for mptcp connection. The server 605 may acknowledge this and may inform the UE that another interface IP_s2 is available for a MPTCP connection in the server. This way UE 600 and server 605 may establish a mptcp connection using interface(y) and interface(x) in the UE 600 and interface(IP1_s) and interface(IP2_s) in the server 605 for a MPTCP connection with subflows 526, 528.

Having a MPTCP connection available for a use by an application, application may use a MPTCP connection via a single TCP port pair (source and destination) and MPTCP protocol may use IP address pairs (source and destination) over multiple IP routing paths accordingly. Subflows between IP addresses IPy_UE and IP1_s (to both directions) and subflows between IP addresses IPx_UE and IP2_s (to both directions) may be independent and may be routed independently from each other. The use of IP addresses in the source and destination respectively may be controlled by the MPTCP protocol and the use of IP interfaces may be managed and optimized by the use of MPTCP algorithms in the end-nodes of a MPTCP connection i.e. in the UE 600 and in the server 605. The joint-congestion control algorithm and other TCP algorithms may balance the use of data paths according to their bandwidth, delay, and other properties, which may dynamically change. MPTCP connection is bi-directional and is driven by the MPTCP protocol, MPTCP algorithms and path properties accordingly. The MPTCP Acknowledgements drive the behavior of a source.

FIG. 12 shows that the subflows may utilize a single PDN connectivity with multiple IP addresses. In some embodiments, multiple PDN connectivity may be utilized, wherein the PDN connections belong to the same APN, or they may utilize multiple PDN connectivity, wherein the PDN connections belong to a different APN. From the MPTCP point of view, the knowledge of IP addresses IPy_UE, IP1_s and IPx_UE, IP2_s for a TCP port pair is sufficient and a PDN connectivity or presence of MCG bearer and SCG bearer are not visible to an actual TCP/IP functionality in a UE or a server. The properties and resource management of a MCG bearer and a SCG bearer and their respective data path characteristics have an impact to the MPTCP performance according to embodiments of the invention. The use of transport bearers in a RAN is shown by the cloud 610 for a PDN connection serving subflows 526, 528. Corresponding configurations may be drawn for a single PDN connectivity as shown in FIG. 12, for multiple PDN connectivity, the latter for a single APN for multiple APNs.

Embodiments of the invention may be employed in a 3GPP network. They may be employed also in other mobile networks enabling multiple data paths such as CDMA, EDGE, UMTS, LTE, LTE-A, Wi-Fi networks, etc.

A terminal may be any device capable to be connected to the radio access network, such as a UE, a laptop, a tablet, a smartphone, a communicator, a machine, a robot, a wearable etc.

Embodiments of the invention are described for two base stations and two data paths. However, the number of base stations per data path may be larger than two. For example, if the base stations are arranged in groups such as MCG and/or SCG, a data path may use some or all of the base stations of the respective base station group. The MCG may provide resources for multiple cells and multiple component carriers. The SCG may provide resources for multiple cells and multiple component carriers.

Also, the number of data paths is not limited to two. The UE may have more than two data paths with related IP addresses. Each of the data paths may comprise one or more base stations.

Embodiments of the invention are not limited to IPv6. They may use any suitable protocol. For example, IPv4 may be used if the P-GW assigns several IP addresses to the UE, and the MPTCP in the UE or the MPTCP in the server or combination thereof may select some of them for a multipath connection setup. This multipath setup is beneficial over LTE if, according to some embodiments of the invention, LTE network and LTE device are able to map the IP addresses to different data paths, the data paths being in dual connectivity. Also, embodiments of the invention may employ future versions of the internet protocol or a related protocol.

According to some embodiments of the invention, the terminal may be a LTE dual connectivity capable UE. According to some embodiments of the invention the EPC supports dual LTE radio interfaces/data paths associated to a single PDN connection. According to some embodiments of the invention, the EPC supports dual LTE interfaces/data paths associated to multiple PDN connections. According to some embodiments of the invention MPTCP protocol, MPTCP services are provided over the Intra-LTE access dual connectivity.

Distribution of downlink traffic to different data paths may be based on MPTCP, as described. However, in some embodiments of the invention, only part of the MPTCP algorithms may be implemented or other algorithms than MPTCP may be used to decide on the distribution of traffic to different data paths. For example, downlink traffic responding to uplink traffic may be routed via the data path on which the uplink traffic was routed. In some embodiments, the decision on the respective data path for downlink traffic may be communicated to the P-GW via signaling messages from a control entity.

Embodiments of the invention are described where multiple data paths are used for both uplink and downlink of a terminal. However, according to some embodiments of the invention, multiple data paths may be used for the uplink only, whereas all downlink traffic is routed via a single downlink data path to the terminal. Also in some embodiments of the invention, multiple data paths may be used for the downlink only, whereas all uplink traffic is routed via a single uplink path to the server. Also, in some embodiments of the invention, specific downlink traffic may be sent over multiple data paths, whereas other downlink traffic may be sent over a single data path. In each case, whether using multipath to one or both link directions, TCP Acknowledgements may be expected to the reverse direction, as TCP forms a bi-directional connection between the source and destination TCP ports.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality. The functionality may be integral to one or few of the network elements or it may be shared or distributed among the network elements, or their cloud.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that exemplary embodiments of the present invention provide, for example a terminal such as a user equipment, or a component thereof, an apparatus embodying the same, a method for controlling and/or operating the same, and computer program(s) controlling and/or operating the same as well as mediums carrying such computer program(s) and forming computer program product(s). Furthermore, according to the above description, it should thus be apparent that exemplary embodiments of the present invention provide, for example a gateway such as a P-GW, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
configuring means adapted to configure a first internet protocol address and a second internet protocol address for a connection between the apparatus and a packet data network;
assigning means adapted to assign the first internet protocol address to a first data path for the connection and to assign the second internet protocol address to a second data path for the connection;
mapping means adapted to map the first internet protocol address for the connection to the first data path of a first base station and to map the second internet protocol address for the connection to the second data path of a second base station;
signaling means adapted to signal a mapping information, wherein the mapping information comprises a mapping of the first internet protocol address to the first data path and of the second internet protocol address to the second data path; and
distributing means adapted to distribute traffic by a multipath transmission control protocol between the apparatus and at least one packet data network over the first data path and the second data path, wherein:
at least a part of the first data path belongs to a radio access network of a radio access technology;
at least a part of the second data path belongs to the radio access network of the radio access technology;
the at least a part of the first data path is different from the at least a part of the second data path; and
the first base station is a master base station, and the second base station is a secondary base station operating in dual-connectivity for the apparatus.

2. The apparatus according to claim 1, wherein the at least a part of the first data path is via a first base station, and the at least a part of the second data path is via a second base station different from the first base station.

3. The apparatus according to claim 2, wherein the first base station is a master base station, and the second base station is a secondary base station of a dual-connectivity architecture.

4. The apparatus according to claim 1, further comprising:
routing means adapted to route an uplink traffic via at least one of the first data path and the second data path.

5. An apparatus, comprising:
identifying means adapted to identify a mapping of a first internet protocol address to a first data path of a first base station and of a second internet protocol address to a second data path of a second base station based on a message received from a terminal, wherein the second data path is different from the first data path; and
assigning means adapted to assign the first internet protocol address to the first data path for a downlink traffic to the terminal and the second internet protocol address to the second data path for the downlink traffic to the terminal, wherein:
at least a part of the first data path belongs to a radio access network of a radio access technology;
at least a part of the second data path belongs to the radio access network of the radio access technology;
the at least a part of the first data path is different from the at least a part of the second data path; and
the first base station is a master base station, and the second base station is a secondary base station operating in dual-connectivity.

6. The apparatus according to claim 5, wherein:
the message is received via session management signaling between the terminal and the apparatus.

7. An apparatus, comprising:
identifying means adapted to identify a first internet protocol address from a first traffic received via a first data path of a first base station from a terminal and to identify a second internet protocol address from a second traffic received via a second data path of a second base station from the terminal, wherein the second data path is different from the first data path; and
assigning means adapted to assign the first internet protocol address to the first data path for a downlink traffic to the terminal and to assign the second internet protocol address to the second data path for the downlink traffic to the terminal, wherein:
at least a part of the first data path belongs to a radio access network of a radio access technology;
at least a part of the second data path belongs to the radio access network of the radio access technology;
the at least a part of the first data path is different from the at least a part of the second data path; and
the first base station is a master base station, and the second base station is a secondary base station operating in dual-connectivity.

8. The apparatus according to claim 7, wherein the first address is a source internet protocol address of the first traffic, and the second address is a source address of the second traffic.

9. The apparatus according to claim 5, further comprising:
routing means adapted to route a received downlink traffic to the terminal via at least one of the first data path and the second data path.

10. A method, comprising:
configuring a first internet protocol address and a second internet protocol address for a connection between an apparatus performing the method and a packet data network;
assigning the first internet protocol address to a first data path for the connection and to assign the second internet protocol address to a second data path for the connection;
mapping the first internet protocol address for the connection to the first data path of a first base station and map the second internet protocol address for the connection to the second data path of a second base station;
signaling a mapping information, wherein the mapping information comprises a mapping of the first internet protocol address to the first data path and of the second internet protocol address to the second data path; and
distributing traffic by at least one multipath transmission control protocol to at least one packet data network over the first data path and the second data path, wherein:
at least a part of the first data path belongs to a radio access network of a radio access technology;
at least a part of the second data path belongs to the radio access network of the radio access technology;
the at least a part of the first data path is different from the at least a part of the second data path; and
the first base station is a master base station, and the second base station is a secondary base station operating in dual-connectivity.

11. The method according to claim 10, wherein the at least a part of the first data path is via a first base station, and the at least a part of the second data path is via a second base station different from the first base station.

12. The method according to claim 11, wherein the first base station is a master base station and the second base station is a secondary base station of a dual-connectivity architecture.

13. The method according to claim 10, wherein the part of the first data path belongs to a radio access network, and the part of the second data path belongs to the radio access network.

14. The method according to claim 13, wherein the at least a part of the first data path belongs to a first cell layer of the radio access network, and the at least a part of the second data path belongs to a second cell layer of the radio access network, wherein the first cell layer is different from the second cell layer.

15. The method according to claim 10, further comprising:
routing an uplink traffic via at least one of the first data path and the second data path.

16. A method, comprising:
identifying a mapping of a first internet protocol address to a first data path of a first base station and of a second internet protocol address to a second data path of a second base station based on a message received from a terminal, wherein the second data path is different from the first data path and at least a part of the first data path; and
assigning the first internet protocol address to the first data path for a downlink traffic to the terminal and the second internet protocol address to the second data path for the downlink traffic to the terminal, wherein:
at least a part of the first data path belongs to a radio access network of a radio access technology;
at least a part of the second data path belongs to the radio access network of the radio access technology;
the at least a part of the first data path is different from the at least a part of the second data path; and
the first base station is a master base station, and the second base station is a secondary base station operating in dual-connectivity.

17. The method according to claim 16, wherein:
the message is received via session management signaling between the terminal and the apparatus.

18. A method, comprising:

identifying a first internet protocol address from a first traffic received via a first data path of a first base station from a terminal and to identify a second internet protocol address from a second traffic received via a second data path of a second base station from the terminal, wherein the second data path is different from the first data path and at least a part of the first data path; and assigning the first internet protocol address to the first data path for a downlink traffic to the terminal and to assign the second internet protocol address to the second data path for the downlink traffic to the terminal, wherein:

at least a part of the first data path belongs to a radio access network of a radio access technology;

at least a part of the second data path belongs to the radio access network of the radio access technology;

the at least a part of the first data path is different from the at least a part of the second data path; and the first base station is a master base station, and the second base station is a secondary base station operating in dual-connectivity.

19. The method according to claim 18, wherein the first address is a source address of the first traffic, and the second address is a source address of the second traffic.

20. The method according to claim 16, further comprising:

routing a received downlink traffic to the terminal via at least one of the first data path and the second data path.

* * * * *